United States Patent [19]
Amundson et al.

[11] Patent Number: 6,028,018
[45] Date of Patent: Feb. 22, 2000

[54] WET WIPES WITH IMPROVED SOFTNESS

[75] Inventors: John David Amundson; John Charles Eckert, both of Appleton; Mark George Everson, Neenah, all of Wis.; David Martin Jackson, Roswell, Ga.; Walter Theodore Schultz, Appleton, Wis.; Charles Allen Smith, Atlanta; David Craige Strack, Canton, both of Ga.

[73] Assignee: Kimberly-Clark Worldwide, Inc., Neenah, Wis.

[21] Appl. No.: 08/706,621

[22] Filed: Sep. 6, 1996

Related U.S. Application Data

[60] Provisional application No. 60/022,326, Jul. 24, 1996.

[51] Int. Cl.[7] .................................................. B32B 27/02
[52] U.S. Cl. ..................... 442/381; 442/382; 442/384; 442/385; 442/389; 442/411; 442/416
[58] Field of Search ............................... 442/381, 389, 442/382, 384, 385, 411, 416

[56] References Cited

U.S. PATENT DOCUMENTS

| | | | |
|---|---|---|---|
| 2,357,392 | 9/1944 | Francis, Jr. | 18/47.5 |
| 2,464,301 | 3/1949 | Francis, Jr. | 154/46 |
| 3,837,995 | 9/1974 | Floden | 161/150 |
| 4,075,382 | 2/1978 | Chapman et al. | 428/192 |
| 4,100,324 | 7/1978 | Anderson et al. | 428/288 |
| 4,239,792 | 12/1980 | Ludwa | 428/198 |
| 4,287,251 | 9/1981 | King et al. | 428/198 |
| 4,331,730 | 5/1982 | Sorenson | 428/286 |
| 4,355,066 | 10/1982 | Newman | 428/198 |
| 4,370,289 | 1/1983 | Sorenson | 264/113 |
| 4,429,001 | 1/1984 | Kolpin et al. | 428/283 |
| 4,469,734 | 9/1984 | Minto et al. | 428/134 |
| 4,603,069 | 7/1986 | Hag et al. | 428/76 |
| 4,604,313 | 8/1986 | McFarland et al. | 428/172 |
| 4,668,566 | 5/1987 | Braun | 428/286 |
| 4,741,944 | 5/1988 | Jackson et al. | 428/152 |
| 4,753,844 | 6/1988 | Jones et al. | 428/288 |
| 4,784,892 | 11/1988 | Storey et al. | 428/172 |
| 4,833,003 | 5/1989 | Win et al. | 428/198 |
| 4,837,078 | 6/1989 | Harrington | 428/284 |
| 4,853,281 | 8/1989 | Win et al. | 428/286 |
| 4,906,513 | 3/1990 | Kebbell et al. | 428/198 |
| 5,350,624 | 9/1994 | Georger et al. | 428/219 |
| 5,498,463 | 3/1996 | McDowall et al. | 428/198 |
| 5,508,102 | 4/1996 | Georger et al. | 428/297 |
| 5,512,358 | 4/1996 | Shawver et al. | 428/286 |
| 5,542,566 | 8/1996 | Glaug et al. | 221/48 |

FOREIGN PATENT DOCUMENTS

| | | | |
|---|---|---|---|
| 0 370 835 A2 | 5/1990 | European Pat. Off. | B32B 5/26 |
| 0 392 316 A1 | 10/1990 | European Pat. Off. | A47L 13/17 |
| 0 557 659 A2 | 9/1993 | European Pat. Off. | D04H 13/00 |
| 2647091 | 11/1990 | France . | |
| 83/6156 | 8/1983 | South Africa . | |
| WO 96/39553 A1 | 12/1996 | WIPO | D04H 1/46 |

*Primary Examiner*—Elizabeth M. Cole
*Attorney, Agent, or Firm*—Brian C. Pauls

[57] ABSTRACT

An improved wet wipe includes a multiple layer basesheet to provide a unique combination of properties to the wipe which are not capable in a single layer basesheet. The layered basesheet includes at least two layers which include different fibers and have different physical properties. One of the layers may include polyethylene fibers to provide a soft, gentle feel for contacting the skin of the user during use while the other layer may include polypropylene fibers to provide strength and resiliency to the wipe to withstand the forces exerted by the user, and maintain its shape and integrity in use.

16 Claims, No Drawings

WET WIPES WITH IMPROVED SOFTNESS

This is a nonprovisional application claiming the benefit of copending provisional application No. 60/022,326 filed on Jul. 24, 1996.

BACKGROUND OF THE INVENTION

1. Field of the Invention

The present invention relates to wet wipes having improved softness. The invention particularly concerns wet wipes which include a multiple layer basesheet for improved softness and flexibility while maintaining strength and resiliency.

2. Description of the Related Art

Wet wipes are well known commercial consumer products which have been available in many forms. Perhaps the most common form of wet wipes has been a stack of moistened sheets which have been packaged in a plastic container. The wet wipes have been made from a variety of materials which have been moistened with a variety of suitable wiping solutions. Such wet wipes have been used for baby wipes, hand wipes, household cleaning wipes, industrial wipes and the like.

Typically, such conventional wet wipes have included a single layer of a substantially homogeneous material. For example, conventional wet wipes have included an air laid web of fibers which are uniformly mixed or distributed throughout the web. The wipes have included polymeric fibers such as polyester, polyethylene and polypropylene and natural or synthetic fibers such as cellulosic fibers. Other conventional wet wipes have included a coformed web of polypropylene and cellulosic fibers wherein the fibers are uniformly mixed throughout the web.

However, the balance of physical properties, such as softness, flexibility, strength, integrity and resiliency, of wet wipes having fibers which are uniformly mixed throughout the thickness of the material has not been completely optimized. This has been particularly true for those users desiring improved softness. For example, certain fibers which may be used for wet wipes are stiffer and can provide strength and resiliency but are not as soft or flexible as other fibers. Whereas, other fibers which may be used for wet wipes are softer but may not have sufficient wet strength to withstand the forces exerted by the user. The softness of the wiping surface of the wipes is perceived to be particularly important for baby wipes which are intended to contact the soft skin of an infant. Moreover, the different types of fibers which may provide the desired properties, such as fibers for strength and fibers for softness, have been difficult to combine in a homogeneous layer due to incompatibilities with each other. Accordingly, it remains desirable to provide wet wipes with improved softness and flexibility while maintaining the strength, integrity and resiliency of the wipes.

SUMMARY OF THE INVENTION

In response to the difficulties and problems discussed above, new wet wipes which have improved softness and flexibility with adequate strength, integrity and resiliency have been discovered.

In one aspect, the present invention relates to a wet wipe which includes a nonwoven, layered basesheet. The layered basesheet includes at least two layers positioned in facing relation with each other wherein one of the layers includes fibers which are not included in the other layer. In a particular embodiment, one of the layers includes polyethylene fibers and one of the layers includes polypropylene fibers.

In another aspect, the present invention relates to a multilayer wet wipe which includes a liquid, a first nonwoven outer layer, a second nonwoven outer layer positioned in facing relation with the first outer layer, and a nonwoven inner layer positioned between the first and second layers. The outer layers include different fibers than the inner layer. As such, the outer layer can be configured to provide different physical properties, such as softness, to the wet wipe while the inner layer may be configured to provide other properties, such as strength, to the wet wipe. For example, the first and said second outer layers may include polyethylene fibers for softness and the inner layer may include polypropylene fibers for strength. In a particular embodiment, the outer layers include a mixture of polyethylene fibers and natural fibers and the inner layer includes a mixture of polypropylene fibers and natural fibers.

In another aspect, the present invention relates to a method of providing wet wipes which includes a) providing a first continuously moving nonwoven layer of material; b) providing a second continuously moving nonwoven layer of material in facing relation with the first nonwoven layer to provide a layered, nonwoven basesheet wherein the second layer contains fibers which are not included in the first layer; c) passing the layered basesheet between a pair of rotatable nip rolls to at least partially secure the first and second layers together; d) adding a liquid to the layered basesheet; and e) cutting the continuously moving layered basesheet into individual sheets to provide the wet wipes. In a particular embodiment, the method further includes providing a third continuously moving nonwoven layer of material in facing relation with the second nonwoven layer to sandwich the second layer of material between the first and third layers of material to provide the layered, nonwoven basesheet. The first and third layer may include coform layers of polyethylene fibers and natural fibers and the second layer may include a coform layer of polypropylene fibers and natural fibers.

The present invention, in its various aspects, advantageously provides an improved wet wipe which includes a layered, nonwoven basesheet. The use of a layered basesheet allows the incorporation of different fibers into different layers of the basesheet to provide different properties. Thus, the different layers may be configured to provide the optimum balance of physical properties, such as softness, flexibility, strength, integrity and resiliency to the wet wipes. As a result, the wet wipes according to the present invention have improved performance and consumer acceptance when compared to conventional wet wipes which include a single homogeneous layer.

DETAILED DESCRIPTION OF THE INVENTION

The present invention relates to new wet wipes which have improved softness while maintaining adequate strength and resiliency and a method of producing the same. The wet wipes of the present invention can be used for baby wipes, hand wipes, face wipes, cosmetic wipes, household wipes, industrial wipes and the like.

The wet wipes of the present invention comprise a layered basesheet which contains a liquid. The liquid can be any solution which can be absorbed into the wet wipe basesheet and may include any suitable components which provide the desired wiping properties. For example, the components may include water, emollients, surfactants, fragrances, preservatives, chelating agents, pH buffers or combinations thereof as are well known to those skilled in the art. The liquid may also contain lotions and/or medicaments.

The amount of liquid contained within each wet wipe may vary depending upon the type of material being used to provide the wet wipe, the type of liquid being used, the type of container being used to store the wet wipes, and the desired end use of the wet wipe. Generally, each wet wipe can contain from about 150 to about 600 weight percent and desirably from about 250 to about 450 weight percent liquid based on the dry weight of the wipe for improved wiping. In a particular aspect, the amount of liquid contained within the wet wipe is from about 300 to about 400 weight percent and desirably about 330 weight percent based on the dry weight of the wet wipe. If the amount of liquid is less than the above-identified ranges, the wet wipe may be too dry and may not adequately perform. If the amount of liquid is greater than the above-identified ranges, the wet wipe may be oversaturated and soggy and the liquid may pool in the bottom of the container.

Each wet wipe is generally rectangular in shape and may have any suitable unfolded width and length. For example, the wet wipe may have an unfolded length of from about 2.0 to about 80.0 centimeters and desirably from about 10.0 to about 25.0 centimeters and an unfolded width of from about 2.0 to about 80.0 centimeters and desirably from about 10.0 to about 25.0 centimeters. Typically, each individual wet wipe is arranged in a folded configuration and stacked one on top of the other to provide a stack of wet wipes. Such folded configurations are well known to those skilled in the art and include c-folded, z-folded, quarter-folded configurations and the like. The stack of folded wet wipes may be placed in the interior of a container, such as a plastic tub, to provide a package of wet wipes for eventual sale to the consumer. Alternatively, the wet wipes may include a continuous strip of material which has perforations between each wipe and which may be arranged in a stack or wound into a roll for dispensing.

The layered basesheet of the wet wipes of the present invention includes at least two layers of material having different physical properties. The different physical properties which a layer may be configured to provide by selecting the appropriate materials include softness, resiliency, strength, flexibility, integrity, toughness, absorbency, liquid retention, thickness, tear resistance, surface texture, drapability, hand, wettability, wicking ability and the like and combinations thereof. Desirably, the materials used for the layered basesheet are configured to provide softness and flexibility while maintaining adequate strength, integrity and resiliency, particularly when wetted. For example, the wet wipes may include at least one layer of material which is configured to provide strength and resilience to the wet wipe and at least one other layer which is configured to provide a soft, gentle wiping surface to the wet wipe. Desirably, the wet wipes include a soft layer on each side of a strong and resilient layer such that both exposed surfaces of the wipe provide a soft, gentle surface for contact with the skin.

Each layer of the wet wipes can be made from a variety of materials including meltblown materials, coform materials, air-laid materials, bonded-carded web materials, hydroentangled materials, spunbond materials and the like and can comprise synthetic or natural fibers. Desirably, all of the layers of the layered basesheet include fibrous materials which provide an improved appearance and feel to the wet wipe. Examples of natural fibers suitable for use in the present invention include cellulosic fibers such as wood pulp fibers, cotton fibers, flax fibers, jute fibers, silk fibers and the like. Examples of thermoplastic polymeric fibers suitable for use with the present invention include polyolefins such as polypropylene and polyethylene, polyamides, and polyesters such as polyethyleneteraphthalate. Alternative synthetic fibers which may be suitable include staple nylon and rayon fibers. One of the principle advantages of the present invention is that the types of fibers in each layer of the layered basesheet may be different to achieve a particular combination of physical properties in the final layered basesheet which may not be obtainable using a single layer of material. As a result, the layered basesheet according to the different aspects of the present invention may include different layers which include different fibers which would be incompatible with each other in a single layer.

For example, the layered basesheet of the present invention may include at least one soft and flexible layer which includes soft polymeric fibers, such as linear low density polyethylene fibers and/or other polymeric fibers having similar properties. The soft polymeric fibers may or may not be combined with natural fibers such as cellulosic fibers. The layered basesheet may also include at least one strong, resilient layer which may include resilient polymeric fibers with relatively high tensile strength, such as polypropylene fibers and/or other polymeric fibers having similar properties. Such strong polymeric fibers may or may not be combined with natural fibers such as cellulosic fibers. Desirably, at least one of the layers contains natural fibers such as cellulosic fibers to provide improved thickness and wettability to the basesheet. The natural fibers may also provide void volume within the basesheet which allows for improved moisture retention.

If a layer of the layered basesheet is a combination of polymeric and natural fibers, such as polypropylene and cellulosic fibers, the relative percentages of the polymeric fibers and natural fibers in the layer can vary over a wide range depending on the desired characteristics of the wet wipes. For example, the layer may comprise from about 20 to about 95 weight percent, desirably from about 20 to about 60 weight percent, and more desirably from about 30 to about 40 weight percent of polymeric fibers based on the dry weight of the layer. Such a layer of polymeric and natural fibers may be manufactured by any method known to those skilled in the art.

Generally, it is desirable that such a layer be formed by a coform process for a more uniform distribution of the polymeric and natural fibers within the layer. Such coform layers are manufactured generally as described in U.S. Pat. No. 4,100,324 to Anderson et al. which issued Jul. 11, 1978; U.S. Pat. No. 4,604,313 to McFarland et al. which issued Aug. 5, 1986; and U.S. Pat. No. 5,350,624 which issued Sep. 27, 1994; which are herein incorporated by reference to the extent they are consistent herewith. Typically, such coform layers comprise a gas-formed matrix of thermoplastic polymeric meltblown microfibers, such as, for example, polypropylene microfibers, and cellulosic fibers, such as, for example, wood pulp fibers. A coform layer is formed by initially forming at least one primary air stream containing the synthetic or polymeric fibers and merging the primary stream with at least one secondary stream of natural or cellulosic fibers. The primary and secondary streams are merged under turbulent conditions to form an integrated stream containing a thorough, homogeneous distribution of the different fibers. The integrated air stream is directed onto a forming surface to air form the layer of material. A multiplicity of these coform layers can then be formed in succession to provide a web of multiple coform layers.

In a particular embodiment, the wet wipe of the present invention includes a three layer coform basesheet which includes an inner strong, resilient layer positionedbetween two outer, soft and flexible layers. The inner strong, resilient layer comprises a coformed layer of meltblown polypropylene microfibers and wood pulp fibers wherein the pulp to polymer weight ratio is from about 50/50 to about 75/25 and desirably about 65/35. A suitable polypropylene is available from Montel under the trade designation MONTEL PF015. The outer soft layers comprise a coformed layer of meltblown linear low density polyethylene microfibers and wood pulp fibers wherein the pulp to polymer weight ratio is from about 50/50 to about 75/25 and desirably about 65/35. A suitable polyethylene is available from Dow under the trade designation DOW 6831A.

The different fibers in the different layers of the layered basesheet of the present invention, such as the polypropylene and polyethylene microfibers set forth above, typically may not be compatible with and may not bond to each other. However, the different fibers may entangle with each other resulting in suitable securement between the layers. For example, in a layered basesheet containing a coform layer of polyethylene and cellulosic fibers and a coform layer of polypropylene and cellulosic fibers, the polyethylene and polypropylene fibers may entangle with each other and the cellulosic fibers and may at least partially bond to the cellulosic fibers which results in securement between the layers.

Such interlayer bonding and entanglement may be enhanced by a thermo-mechanical process wherein the layered basesheet is passed between a heated smooth anvil roll and a heated pattern roll. The pattern roll may have any raised pattern which provides the desired entanglement and interlayer bonding. Desirably, the pattern roll defines a raised pattern which defines a plurality of bond locations which define a bond area of between about 4 and about 30 percent of the total area of the roll for improved interlayer attachment.

The pressure between the rolls and the temperature of the rolls must be balanced to produce a basesheet having adequate strength and integrity while maintaining the softness of the outer layers. The temperature and pressure may vary depending upon the types of fibers being used to provide the desired wet wipe. In a particular embodiment wherein the layers comprise at least one layer of polyethylene fibers and at least one other layer of polypropylene fibers, the pressure between the rolls may be between about 5 and about 90 kilograms per lineal centimeter and the temperature of at least one of the rolls may be between about 65 and about 95 degrees Centigrade for improved entanglement and bonding. Under such conditions of temperature and pressure, the polyethylene fibers deform to provide mechanical entanglement with and possible bonding to the polypropylene fibers. As a result, the layers become entangled and bonded in discrete areas arranged in a pattern which corresponds to the raised pattern on the pattern roll.

The layered basesheet for the wet wipes may have a total basis weight of from about 25 to about 120 grams per square meter and desirably from about 40 to about 90 grams per square meter. Such basis weight of the layered basesheet may also vary depending upon the desired end use of the wet wipe. For example, a suitable basesheet for wiping the skin may define a basis weight of from about 60 to about 80 grams per square meter and desirably about 75 grams per square meter. In a particular embodiment wherein the layered basesheet includes coform layers of polypropylene and cellulosic fibers and polyethylene and cellulosic fibers, the layered basesheet defines a basis weight of from about 60 to about 90 grams per square meter and desirably about 80 grams per square meter for improved softness and adequate strength.

Each layer may or may not have a different basis weight depending upon the desired properties such as strength and softness of the wet wipe. For example, in a three layer coform basesheet which includes an inner layer of polypropylene and wood pulp fibers and two outer layers of polyethylene and wood pulp fibers, the basis weight of the layers may define an outer/inner/outer layer weight ratio of from about 10/80/10 to about 40/20/40, desirably about 25/50/25 to about 33/33/33 and more desirably about 30/40/30 based on a total weight of the basesheet for improved performance.

In a particular embodiment, it is desired that the wet wipe of the present invention define sufficient strength to withstand the forces exerted by the user when it is wetted with solution. For example, the layered basesheet for the wet wipes may define a tensile strength of at least about 1.23 Newtons per centimeter in the machine direction and at least about 0.70 Newtons per centimeter in the cross machine direction for improved performance. As used herein, machine direction refers to the direction in which the material is manufactured while the cross machine direction refers to a direction which is perpendicular to the machine direction. In a particular embodiment, wherein the layered basesheet includes coform layers of polypropylene and cellulosic fibers and polyethylene and cellulosic fibers, the layered basesheet defines a tensile strength of from about 1.31 to about 3.50 Newtons per centimeter in the machine direction and from about 0.84 to about 1.40 Newtons per centimeter in the cross machine direction and desirably from about 1.58 to about 1.93 Newtons per centimeter in the machine direction and from about 0.93 to about 1.11 Newtons per centimeter in the cross machine direction. In such a configuration, the coform layer which includes polypropylene fibers provides the majority of the strength to the basesheet while the coform layer which includes the polyethylene fibers provides a soft surface for contact with the skin of the user. Thus, the tensile strength of such a layered basesheet is higher than the tensile strength of a single layer containing polyethylene fibers and provides a softer surface than a single layer containing polypropylene fibers.

The layered basesheet for the wet wipe of the different aspects of the present invention may be provided on a single manufacturing line which includes multiple individual forming banks. Each forming bank is configured to provide an individual layer having the desired properties. For example, the first and last forming banks may be configured to provide the outer, soft layers while the middle or interior forming banks may be configured to provide at least one inner, strong and resilient layer. The mechanical entanglement between the fibers of each layer during the process provides attachment between the layers and may form bonds between the adjacent layers to provide the layered basesheet. Subsequent thermomechanical bonding may also be used on the layered basesheet to improve the attachment between the layers.

Each forming bank may include the appropriate equipment to provide the desired type of web. For example, if each layer comprises a coform layer of meltblown microfibers and natural fibers such as wood pulp fibers, each forming bank may include a plurality of meltblowing dies as are well known to those skilled in the art. In general, meltblowing processes include meltblowing dies which are configured to extrude a molten polymeric material into fine streams. The fine streams are then attenuated by converging flows of high velocity gas to break the polymer streams into discrete microfibers of small diameter. The stream or streams of natural fibers which are converged with the streams of meltblown microfibers may be provided by a conventional pulp picker roll process as is well known to those skilled in the art.

Alternatively, one or more layers of the wet wipe of the different aspects of the present invention can be made from a different type of material such as a meltblown sheet of polymeric microfibers. For example, the inner, strong and resilient layer may include a layer of meltblown polypropylene fibers while the outer soft layers may include a coform layer of polyethylene and wood pulp fibers as described above. The outer soft and flexible layers may otherwise be provided by different types of materials such as airlaid, carded web, or meltblown materials as are set forth above and which are manufactured by processes well known to those skilled in the art.

EXAMPLES

The following examples are presented to provide a more detailed understanding of the invention. The particular materials and parameters are exemplary and are not intended to limit the scope of the invention.

Example 1

Wet wipes were made according to the present invention. Each wet wipe comprised a three layered coform basesheet which included a strong, inner layer positioned between two outer, soft and flexible layers. The strong, inner layer comprised a coform layer of meltblown polypropylene microfibers and wood pulp fibers wherein the pulp to polymer weight ratio was about 65/35. The polypropylene was available from Montel under the trade designation MONTEL PF015. The outer soft layers comprised a coformed layer of meltblown linear low density polyethylene microfibers and wood pulp fibers wherein the pulp to polymer weight ratio was about 65/35. The polyethylene was available from Dow under the trade designation DOW 6831A. The wet wipes had an inner/outer/inner layer weight ratio of about 30/40/30. The wet wipes included a solution similar to that currently being used with Kleenex® Huggies® Unscented Classic Baby Wipes which were commercially available from Kimberly-Clark Corporation, a business having offices located in Neenah, Wis. The wet wipes included about 330 weight percent of the solution based on the dry weight of the wipe.

The wet wipes were subjected to a grab tensile test as is well known to those skilled in the art. The wipes were placed between a pair of jaws and the jaws were pulled apart. The force required to break the wipe was recorded as the tensile strength. The wipes were tested in both the machine direction (MD) and cross machine direction (CD). The wet wipes had an average MD tensile strength of 1.67 Newtons per centimeter (0.95 pounds per inch) and an average CD tensile strength of 1.05 Newtons per centimeter (0.60 pounds per inch).

Comparative Example 1

Kleenex® Huggies® Unscented Classic Baby Wipes which were commercially available from Kimberly-Clark Corporation, a business having offices located in Neenah, Wis. were obtained. Each wet wipe comprised a coform basesheet having about 65 weight percent cellulosic fibers and 35 weight percent polypropylene microfibers based on the dry weight of the basesheet. The polypropylene was available from Montel under the trade designation MONTEL PF015. The wet wipes induced about 330 weight percent solution based on the dry weight of the basesheet.

The wet wipes were subjected to a grab tensile test as described above. The wet wipes had an average MD tensile strength of 316 Newtons per centimeter (1.80 pounds per inch) and an average CD tensile strength of 1.45 Newtons per centimeter (0.83 pounds per inch).

Comparative Example 2

Wet wipes similar to those in Comparative Example 1 except for the polymer were made. Each wet wipe comprised a coform basesheet having about 65 weight percent cellulosic fibers and 35 weight percent polyethylene microfibers based on the dry weight of the basesheet. The polyethylene was available from Dow under the trade designation DOW 6831A. The wet wipes included about 330 weight percent solution based on the dry weight of the basesheet.

The wet wipes were subjected to a grab tensile test as described above. The wet wipes had an average MD tensile strength of 0.38 Newtons per centimeter (0.22 pounds per inch) and an average CD tensile strength of 0.28 Newtons per centimeter (0.16 pounds per inch).

The wet wipes of Example 1 and Comparative Example 1 were also placed in a use test with 55 participants who used the wipes for five days. The participants were then asked several questions regarding the performance of the wipes. The wet wipes of Example 1 (the present invention) were statistically preferred for softness over those described in Comparative Example 1.

Thus, the Examples representatively illustrate that the layered basesheet of the present invention may provide wet wipes having improved softness while still providing adequate strength in use to function as a wet wipe. Accordingly, the different aspects of the present invention can advantageously provide wet wipes which, when compared to conventional wet wipes, are softer and have adequate strength and integrity. Such wet wipes have improved consumer acceptance and can advantageously be used for baby wipes, hand wipes, face wipes, cosmetic wipes, household wipes, industrial wipes and the like.

While the invention has been described in detail with respect to the specific aspects thereof, it will be appreciated that those skilled in the art, upon attaining an understanding of the foregoing, may readily conceive of alterations to, variations of, and equivalents to these aspects. Accordingly, the scope of the present invention should be assessed as that of the appended claims and any equivalents thereto.

What is claimed is:

1. A multilayer wet wipe comprising:
   a) from about 150 to about 600 weight percent of a liquid based on a dry weight of said wipe;
   b) a first nonwoven outer layer defining a first exterior surface of said wet wipe;
   c) a second nonwoven outer layer positioned in facing relation with said first outer layer and defining a second exterior surface of said wet wipe, and
   d) a nonwoven inner layer positioned in facing and adjacently contacting relation between said first outer layer and said second outer layer wherein said outer layers comprise a first polymeric fiber comprising at least about 35 dry weight percentage of said outer layers and a natural fiber comprising at least about 50 dry weight percentage of said outer layers, and said inner layer comprises a second polymeric fiber wherein said first and second polymeric fibers comprise different polymeric meterials.

2. The wet wipe of claim 1 wherein said first polymeric fiber comprises polyethylene fibers.

3. The wet wipe of claim 1 wherein said second polymeric fiber comprises polypropylene fibers.

4. The wet wipe of claim 1 wherein said inner layer further comprises natural fibers.

5. The wet wipe of claim 1 wherein said first polymeric fiber comprises polyethylene fibers.

6. The wet wipe of claim 1 wherein said second polymeric fiber comprises polypropylene fibers and said inner layer further comprises natural fibers.

7. The wet wipe of claim 6 wherein a weight ratio of said natural fibers to said second polymeric fibers in said inner layer is from about 50/50 to about 75/25.

8. The wet wipe of claim 1 wherein a weight ratio of said first outer layer to said inner layer to said second outer layer is from about 10/80/10 to about 40/20/40.

9. The wet wipe of claim 1 wherein said wet wipe defines a tensile strength in a machine direction of at least about 1.23 Newtons per centimeter.

10. The wet wipe of claim 1 wherein said wet wipe defines a total dry basis weight of from about 50 to about 90 grams per square meter.

11. The wet wipe of claim wherein said outer layers are at least partially entangled with said inner layers at a plurality of bond locations which define a bond area of from about 4 to about 30 percent of a surface area between the respective layers.

12. The wet wipe of claim 1 wherein said first polymeric fiber comprises polyethylene fibers and said second polymeric fiber comprises polypropylene fibers.

13. The wet wipe of claim 1 wherein each of said outer layers comprises an homogenous mixture of said polymeric and said natural fibers.

14. The wet wipe of claim 1 wherein said inner layer further comprises a natural fiber and each of said layers comprises a mixture of natural fibers and polymeric fibers.

15. The wet wipe of claim 14 wherein said first polymeric fiber comprises polyethylene fibers and said second polymeric fiber comprises polypropylene fibers.

16. The wet wipe of claim 14 wherein each of said layers comprises an homogenous mixture of said polymeric and said natural fibers.

* * * * *